(12) United States Patent
Fortmann

(10) Patent No.: US 8,471,956 B2
(45) Date of Patent: Jun. 25, 2013

(54) CLOSURE DEVICE FOR AN IMAGE CAPTURE FACILITY

(75) Inventor: Jens Fortmann, Cloppenburg (DE)

(73) Assignee: Bornbex Handels- und Vertriebs GmbH & Co. KG, Cloppenburg (DE)

( * ) Notice: Subject to any disclaimer, the term of this patent is extended or adjusted under 35 U.S.C. 154(b) by 270 days.

(21) Appl. No.: 12/925,821

(22) Filed: Oct. 29, 2010

(65) Prior Publication Data

US 2011/0099908 A1 May 5, 2011

(30) Foreign Application Priority Data

Oct. 29, 2009 (DE) ..................... 20 2009 014 628 U

(51) Int. Cl.
*H04N 5/225* (2006.01)

(52) U.S. Cl.
USPC .......................................................... 348/373

(58) Field of Classification Search
USPC ................................................. 348/373, 374
See application file for complete search history.

(56) References Cited

U.S. PATENT DOCUMENTS

| 6,322,259 | B1 | 11/2001 | Miyamoto et al. |
| 8,242,924 | B2* | 8/2012 | Huang et al. ................. 348/373 |
| 2005/0052567 | A1 | 3/2005 | Huang et al. |
| 2005/0225668 | A1* | 10/2005 | Kim ............................... 348/373 |
| 2006/0073858 | A1* | 4/2006 | Nagashima ................ 455/575.4 |
| 2006/0203124 | A1 | 9/2006 | Park et al. |
| 2008/0176605 | A1 | 7/2008 | Choi et al. |
| 2010/0079661 | A1* | 4/2010 | Lin ............................... 348/371 |
| 2010/0166414 | A1* | 7/2010 | Zhang et al. ................. 396/448 |

FOREIGN PATENT DOCUMENTS

DE 10 2007 056 247 7/2008

OTHER PUBLICATIONS

Search Report of German Patent Application DE 20 2009 014 629.4 finished on Sep. 2, 2010 with English translation of relevant portions.

* cited by examiner

*Primary Examiner* — Gevell Selby
(74) *Attorney, Agent, or Firm* — Collard & Roe, P.C.

(57) ABSTRACT

A closure device for an image capture facility, such as a webcam or the like, integrated in a piece of equipment, includes at least one frame which is able to be fastened on the surface of the piece of equipment, and at least one closure, held so as to be adjustably movable on the frame via a mounting, which is able to be brought into a closed position covering the image capture facility or into an open position exposing the image capture facility.

15 Claims, 4 Drawing Sheets

CLOSURE DEVICE FOR AN IMAGE CAPTURE FACILITY

CROSS REFERENCE TO RELATED APPLICATIONS

Figure 1:
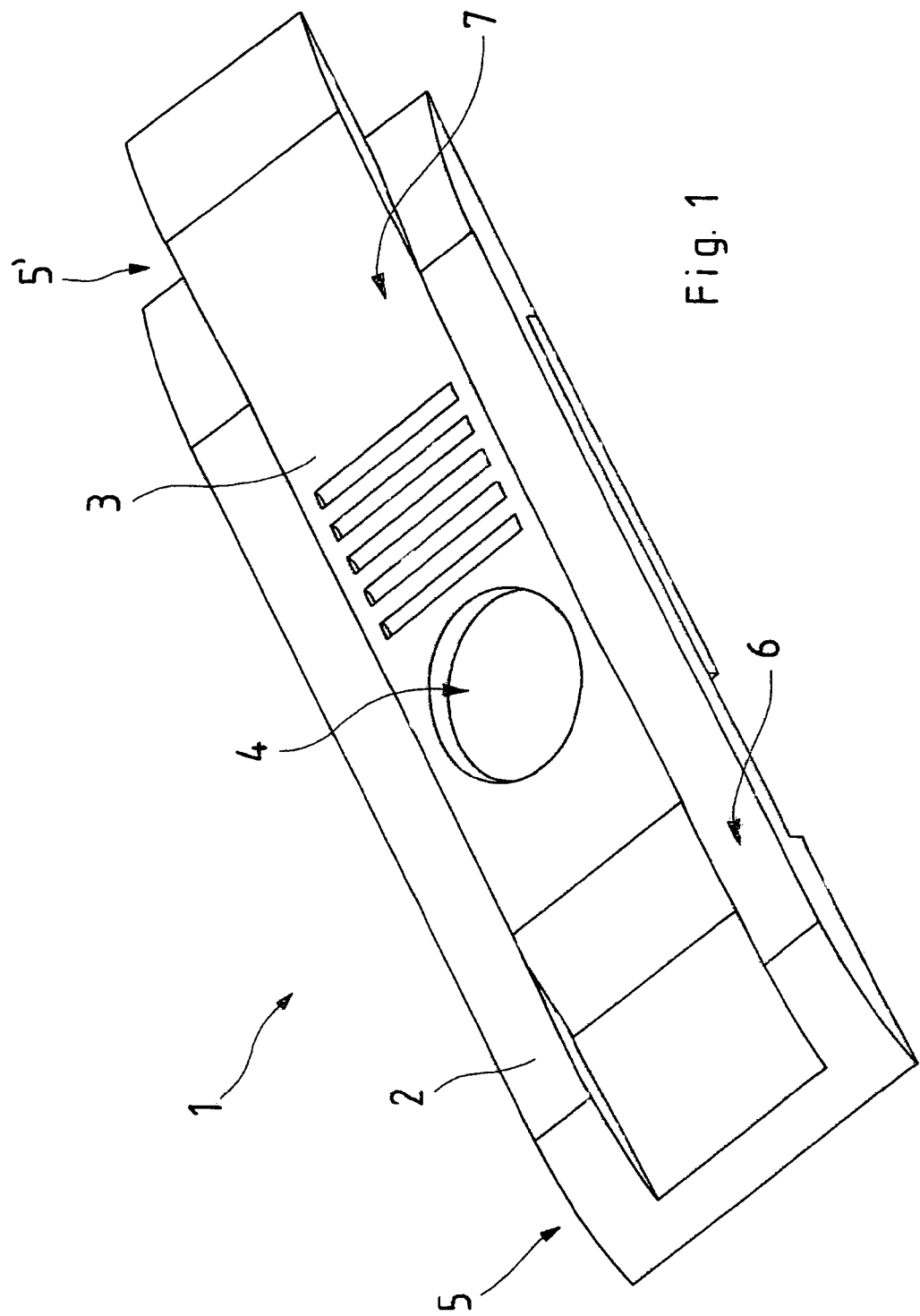

Applicant claims priority under 35 U.S.C. §119 of German Application No. 20 2009 014 628.6 filed on Oct. 29, 2009, the disclosure of which is incorporated by reference.

The invention relates to a closure device for an image capture facility which is integrated in a piece of equipment, such as for example a webcam integrated in a laptop or a screen of a computer.

With the advancing development of computer technology, computers, such as for example desktop computers or laptops, are increasingly also being used in private areas and, in addition to a commercial application, frequently serve there for the entertainment of users. Increasingly here, image capture facilities are coming into use on laptops and monitors of desktop computers as a fixed accessory, which can usually be used for image telephony or for a videoconference via the internet. The image capture facilities coming into use here are increasingly integrated fixedly into the monitor housing of the laptop or desktop computer, which increasingly simplifies their use, because no further external accessory parts are required.

A problem in the integral image capture facilities is simply the fact that the user of the piece of equipment can not detect for certain whether the image capture facility, also designated a webcam, has been put into operation for example by an unauthorized access to the computer from the exterior. In order to protect themselves from a misuse of their own equipment by third parties in this connection, users are increasingly utilizing a commercially available opaque adhesive strip. The adhesive strip is stuck onto the surface of the monitor housing in the region of the image capture facility and thus directly prevents unwanted spying. The—under certain circumstances—relatively frequent sticking on and pulling off again of an adhesive strip serving for the purpose of covering the camera is relatively laborious, wherein in addition the adhesive strip continuously loses its adhesion after a predetermined number of tearing-off and re-sticking processes have been carried out and has to be replaced in predetermined periods of time.

The invention is based on the problem of providing a closure device for an image capture facility, which can be used advantageously in a simple manner also over a lengthy period of time without limitations.

The solution to the problem is carried out according to the invention by a closure device as described herein. Advantageous further developments and embodiments of the invention are also described herein.

In a closure device for an image capture facility, such as a webcam or the like, integrated in a piece of equipment, according to the invention at least one frame is provided which is able to be fastened on the surface of the piece of equipment, and at least one closure, held via a mounting so as to be adjustably movable on the frame, which closure is able to be brought into a closed position, covering the image capture facility, or into an open position exposing the image capture facility.

By means of such a closure device according to the invention, an image capture facility integrated in a piece of equipment, such as for example a monitor housing, can always be covered or respectively exposed in a relatively simple manner in case of need.

A user of a piece of equipment fitted with an image capture facility can therefore always actively ensure that the image capture facility only supplies images when he wishes. The use of a frame and of a closure held thereon so as to be adjustably movable by means of a mounting in addition constitutes an advantageously simple possibility for the formation of a closure device which is preferably to be mounted on the housing of the piece of equipment. To expose the image capture facility, the closure can be swivelled into its open position in particular via the mounting on the frame which is constructed for example as a film hinge. Of course, the closure and the frame can also be in two parts, wherein the closure is placed directly against or on the frame. In this embodiment, the frame and the closure then form a mounting implementing a clamping function.

Advantageously, according to a further development of the invention provision is made that the frame has at least two surface elements on both sides of the image capture facility which are able to be brought into holding operative connection with the surface of the piece of equipment. The construction of the frame with at least two surface elements which are preferably to be applied on opposite sides of the image capture facility onto or against the surface of the piece of equipment constitutes an advantageous possibility for a secure and functionally reliable connection of the frame with the surface of the piece of equipment. In particular on adjustment of the closure, an unintentional detaching of the frame from the surface of the piece of equipment is avoided, because relatively high holding forces can be produced via the two surface elements of the frame. The frame can be fastened on the surface of the piece of equipment for example via screw connections which can engage in the region of the surface elements of the frame.

Each surface element is equipped on its connecting surface, facing the surface of the piece of equipment, with at least one adhesive layer, by means of which an advantageously simple connection can be produced in a relatively simple manner between the connecting surface of the surface elements and the surface of the piece of equipment. The adhesive bond connection can always securely receive the adjustment forces acting on the closure and hence on the frame during the opening or respectively closing of the closure, so that by means of the adhesive bond connection in addition an advantageously secure connection is possible over a relatively long period of time. The adhesive bond connection between surface element and surface of the piece of equipment is implemented in particular by means of an adhesive strip sticking on both sides, which can always be applied with relatively little effort onto the connecting surfaces of the surface elements.

The frame has, furthermore, two cross-pieces running parallel to each other, which usually connect on both sides of the image capture facility surface elements which are to be applied on the surface of the piece of equipment. By means of the cross-pieces, in particular in the plane of the frame, an advantageously rigid embodiment of the frame is ensured, having a specific minimum width of approximately 2 mm. The frame is delimited in particular on the end sides by its surface elements and on the long sides by its frame cross-pieces, running parallel to each other, extending onto the surface elements. Through the specified arrangement of the frame components with respect to each other, in particular in the central region an approximately rectangular opening is formed, which is associated with the image capture facility. After the opening of the closure, the image capture facility can therefore be seen accordingly in the region of the rectangular opening of the frame.

The mounting is preferably constructed as a sliding guide which constitutes a structurally advantageous embodiment of the mounting. The construction as a sliding guide has the advantage in particular in the case of a closure facility arranged on a laptop, that irrespective of the position of the closure, the monitor cover can simply be closed. In the case of a closure constructed as a swivellable flap, on the other hand, when closing the monitor cover the risk exists of unintentionally separating off the still open, swung-open closure from the frame and thereby rendering the closure device unusable.

The sliding guide is formed here from component regions of the frame and of the closure which are in a form-fitting connection with each other. Here, the frame, in particular its frame cross-pieces running parallel to each other at a predetermined distance, can have guide grooves respectively for the closure which is held linearly slidably thereon. For this purpose, the closure can have cross-piece-like projections engaging into the guide grooves, which form a sliding guide in particular with the wall surfaces of the guide groove.

According to a further development of the invention, provision is made that the closure has an adjustment part and an adjustment limiter arranged on the adjustment part. The adjustment part is held here between the cross-pieces of the frame, wherein the cross-pieces have guide surfaces, facing each other, for the adjustment part of the closure. The cross-pieces and the adjustment part have a relatively small clearance, whereby advantageously a movement directed vertically to the actual adjustment direction of the adjustment part is avoided. The adjustment part, having approximately the same length as the frame, has an adjustment limiter, via which in particular its displacement path can be limited in an advantageously simple manner. The adjustment limiter can be constructed for example as at least a cam projecting on the underside of the adjustment part into the free central region of the frame. Such a cam then arrives for example in the open or closed position of the closure in contact with respectively one of the surface elements of the frame, whereby a slipping out of the adjustment part out of the sliding guide of the frame is prevented.

Furthermore, provision can be made that the adjustment part and the adjustment limiter have sliding surfaces running parallel to each other, wherein the sliding surfaces of the adjustment part are in contact with the upper sides of the surface elements of the frame and the sliding surfaces of the adjustment limiter with the undersides of the frame cross-pieces. The adjustment limiter is preferably constructed here as a surface body which extends transversely to the extent direction of the adjustment part. The surface body running in a parallel plane to the adjustment part has sliding surfaces which, however, receive a normal force directed in opposition to the sliding surfaces of the adjustment part. The sliding surfaces of the adjustment part and of the adjustment limiter are therefore facing each other and form accordingly the component regions which are in a form-fitting connection with the frame for the sliding guide. Through this, an optimally acting form-fitting connection is made possible between closure and frame and at the same time an advantageously secure guiding of the closure on the frame is ensured.

At least the closure part of the closure has an aperture for the image capture facility, which is always aligned congruently to the image capture facility when the closure is in its open position. The aperture, which in particular is constructed to be circular, is formed both in the adjustment part and also in the adjustment limiter. Preferably, a covering arrangement is additionally associated with the aperture, which covers the aperture or respectively then projects therein in particular in the closed position of the closure. Therefore, the impression does not incorrectly arise for a user that the closure is unintentionally in its open position. The aperture can also have different geometric shapes, such as for example rectangular or ellipsoid.

At least one engaging element is provided on the frame, which corresponds with at least one mounting on the closure for arresting the closure in its open and/or closed position. The construction of at least one such engaging element has the advantage that the closure can be moved to and fro unintentionally between its open or closed position. The engaging element can, for example, be a projection protruding into the displacement path of the closure, which engages into respective depressions, corresponding therewith, on the closure on reaching the predetermined displacement position. Of course, the closure, in particular its adjustment part, can also be equipped with an engaging element engaging into mountings formed on the frame. Furthermore, the possibility exists of providing the frame in a predetermined region with an identification field which is always visible when the closure is in the position exposing the image capture facility. The user is then always informed as to whether the image capture facility is exposed.

Preferably, the surfaces of the frame and of the closure, held in a slidably movable manner thereon, have in their end regions respectively an outwardly curved path. The frame and the closure, which both individually and also in assembled state have a component thickness or respectively an assembled thickness of approximately one millimeter and less, have a rounded path in particular in their end regions. Especially through the ends of the frame which run out in a flat manner and in particular of the adjustment part of the closure, there are no edges on the end faces of the closure facility which act in an intrusive manner visually or tangibly. Thereby, the closure facility according to the invention is advantageously connected visually with the surface of the piece of equipment. It is only on the long sides that surface boundaries are provided which are constructed as sharp edges, which run in particular parallel to existing edges for example of the monitor housing.

The frame and closure are preferably injection moulded parts which has the asset of an advantageous production of the components with relatively high precision or respectively accuracy. The process of injection moulding usually results in a product which generally does not require any finishing and can therefore be supplied immediately thereafter for mounting.

Plastic is preferably used as the material for the production of the frame and of the closure. Preferably a polyethylene is used for this which, in addition to its advantageous characteristics with regard to strength and wear, is also particularly corrosion-resistant. Furthermore, the plastic which is used is also frequently distinguished by advantageous sliding characteristics, so that an optimal displaceability of the closure on the frame is always guaranteed. It is likewise conceivable to use a metallic material such as aluminium instead of plastic.

According to another further development of the invention, provision is made that the closure is equipped with an adjustment aid. With the use of an adjustment aid, the closure can always be reliably displaced into a respective position, whereby an optimal functionality of the closure device according to the invention is guaranteed. The adjustment aid in this context can be constructed for example as groove-like depressions on the upper side of the adjustment part, which run transversely to the adjustment direction of the closure. The groove-like depressions on the upper side of the adjustment part form advantageous points here for the application of force.

Figure 2:
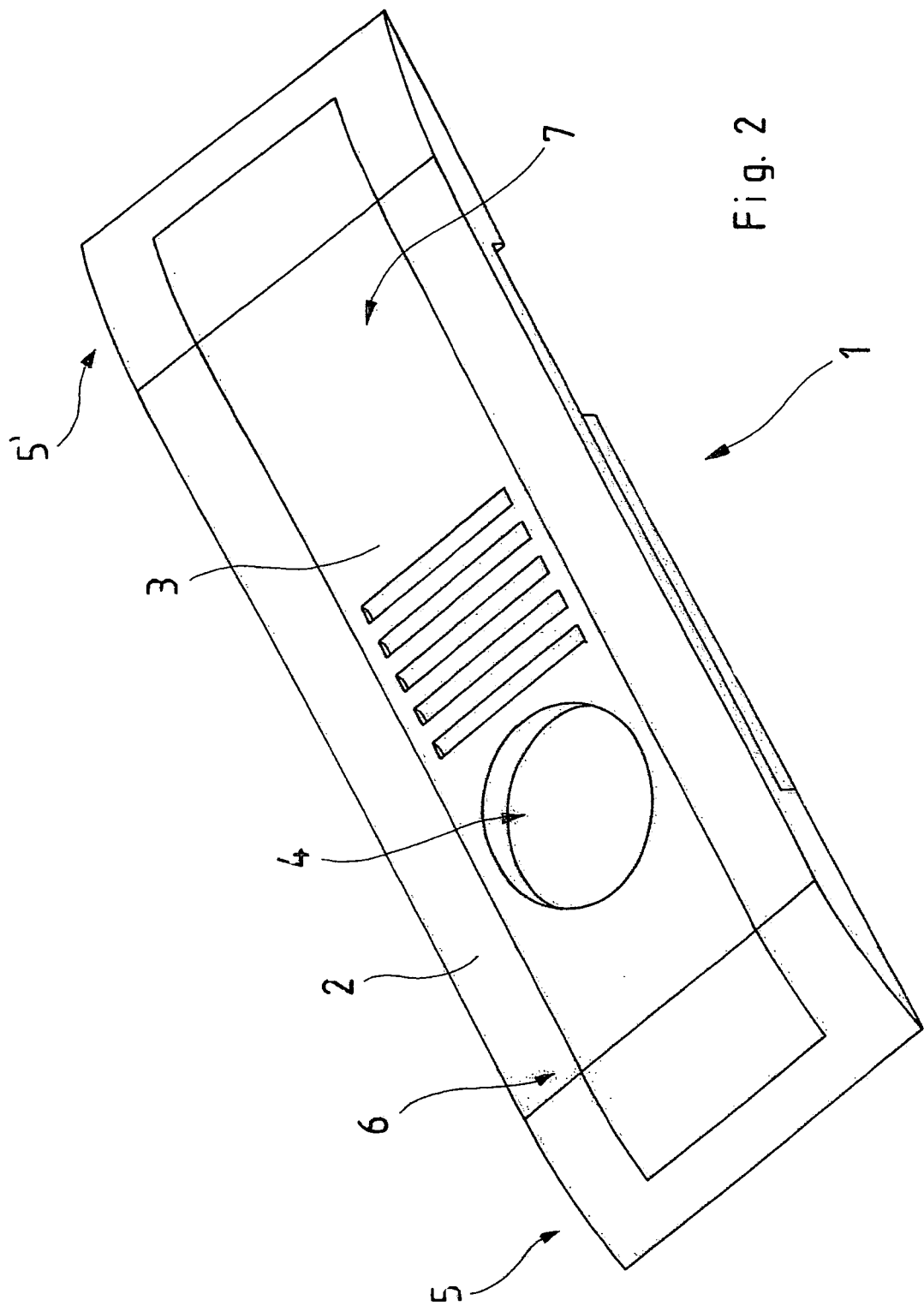
Figure 3:
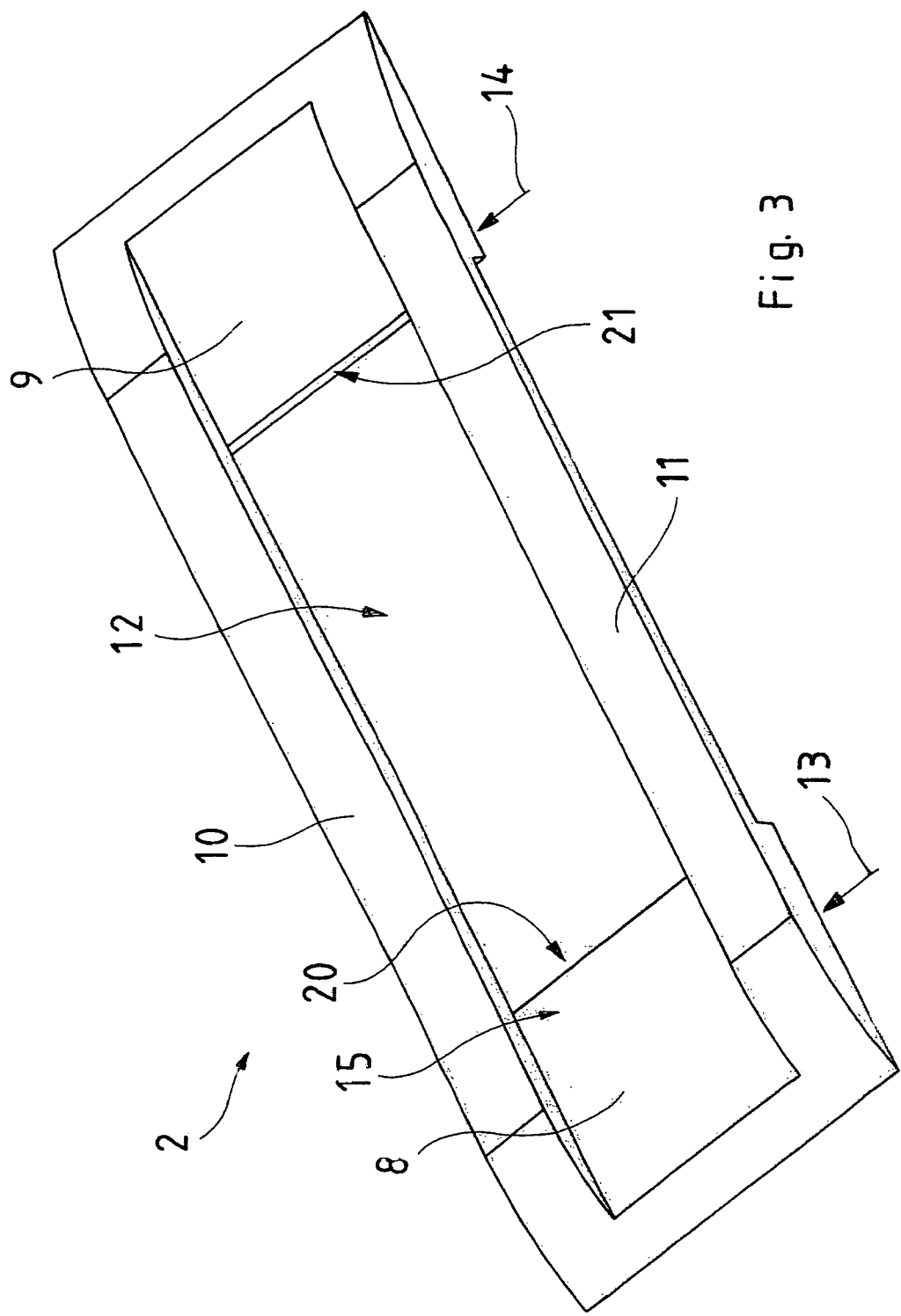

An example embodiment of the closure device according to the invention, from which further inventive features can be seen, is illustrated in the drawings, in which are shown:

FIG. 1: a perspective view of the closure device according to the invention in its open position;

FIG. 2: a perspective view of the device according to the invention according to FIG. 1 in its closed position;

FIG. 3: a detail view of the frame of the closure device, and

Figure 4:
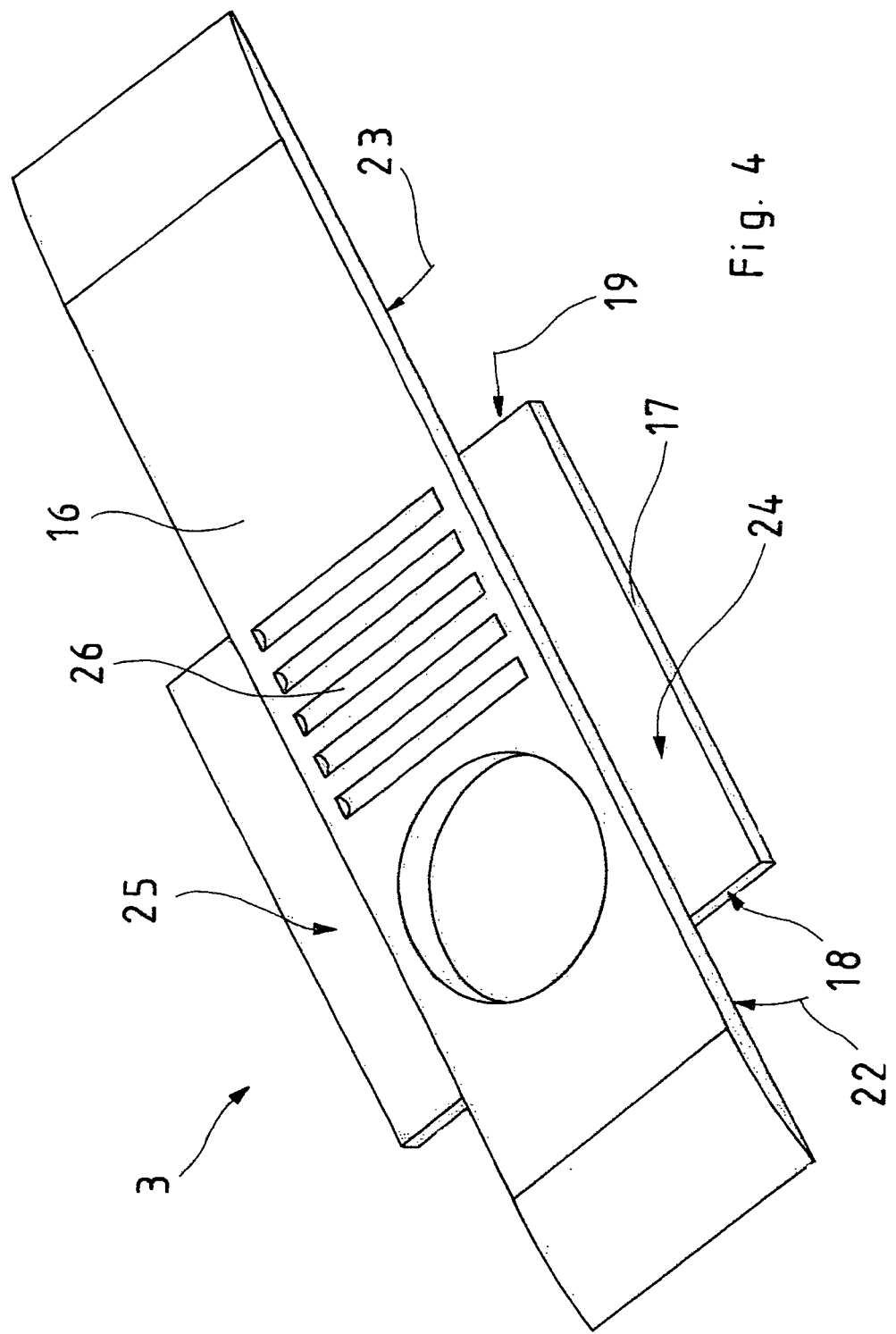

FIG. 4: a perspective detail view of the closure.

A closure device is designated by 1, which has a frame 2 and a closure 3 held displaceably thereon. As FIGS. 1 and 2 show, the closure 3 can be moved from its closed position (FIG. 1) into an open position (FIG. 2). In its open position (FIG. 2) an aperture 4, formed in the closure 3, is then arranged congruently to an image capture facility, which is not illustrated, so that the latter is then ready for operation. The frame 2 and the closure 3 have at their respective end regions 5, 5' lying in the extent direction a curved or respectively rounded path of their surfaces 6, 7, so that on the end faces an almost recess-free transition exists onto a surface, lying therebeneath, of a piece of equipment which has the image capture facility.

FIG. 3 shows as a detail the frame 2 of the closure device, constructed in one piece, which is composed in particular of two surface elements 8, 9 and cross-pieces 10, 11 connecting the surface elements 8, 9 with each other. Between the surface elements 8, 9 and the cross-pieces 10, 11 running parallel to each other, a free central region 12 is provided, which is then aligned accordingly to the image capture facility of the piece of equipment. The frame 2 is fastened on the surface of the piece of equipment in particular via the connecting surfaces 13, 14, provided on the underside of the surface elements 8, 9, preferably by means of an adhesive bond connection. Furthermore, between the cross-pieces 10, 11 of the frame 2, a guide groove or respectively guide path 15 is provided for an adjustment part 16 (FIG. 4) of the closure 3.

In FIG. 4 the closure 3 is illustrated in a detail view, which is formed from an adjustment part 16 and an adjustment limiter 17 extending transversely thereto. The adjustment part 16 has here almost the linear dimension of the frame 2. The adjustment limiter 17 is a surface body which has stop surfaces 18, 19 on the end face, which depending on the position of the closure 3 are alternately in abutment with corresponding run-up surfaces 20, 21 of the surface elements 5, 6 (FIG. 3). Furthermore, the adjustment part 16 has on its underside, and the adjustment limiter 17 has on its upper side, sliding surfaces 22 to 25, which on the one hand ensure the displacement of the closure 3 in the guide groove 15 of the frame 2, and on the other hand ensure a form-fitting connection between the frame 2 and the closure 3 which is guided thereon. In order to simplify the displacement of the closure, the adjustment part 16 has in addition an adjustment aid 26 on its upper side, which is formed as groove-like depressions.

The invention claimed is:

1. Closure device for an image capture facility, integrated in a piece of equipment, comprising at least one frame which is able to be fastened on the surface of the piece of equipment, and at least one closure, held so as to be adjustably movable on the frame via a mounting, which is able to be brought into a closed position covering the image capture facility or into an open position exposing the image capture facility, wherein the frame has at least two surface elements on both sides of the image capture facility which are able to be brought into holding operative connection with the surface of the piece of equipment, and wherein each surface element is equipped on its connecting surface with at least one adhesive layer.

2. Closure device according to claim 1, wherein the frame has two cross-pieces running parallel to each other, which connect the surface elements with each other.

3. Closure device according to claim 1, wherein the mounting is constructed as a sliding guide.

4. Closure device according to claim 3, wherein the sliding guide is formed from component regions of the frame and of the closure which are in form-fitting connection with each other.

5. Closure device according to claim 1, wherein the closure has an adjustment part and at least one adjustment limiter arranged on the adjustment part.

6. Closure device according to claim 5, wherein the adjustment part and the adjustment limiter of the closure have sliding surfaces running parallel to each other.

7. Closure device according to claim 5, wherein at least the adjustment part has an aperture for the image capture facility.

8. Closure device according to claim 1, wherein on the frame at least one engagement element is provided, which corresponds with at least one mounting on the closure for arresting the closure in its open and/or closed position.

9. Closure device according to claim 1, wherein the surfaces of the frame and of the closure, held in a slidably movable manner thereon, have in their end regions respectively an outwardly curved path.

10. Closure device according to claim 1, wherein the frame and closure are injection molded parts.

11. Closure device according to claim 1, wherein the material for the frame and the closure is plastic.

12. Closure device according to claim 1, wherein the closure is equipped with an adjustment aid.

13. Closure device according to claim 12, wherein the adjustment aid is constructed as groove-like depressions on the upper side of the adjustment part, which run transversely to the adjustment direction of the closure.

14. Closure device for an image capture facility, integrated in a piece of equipment, comprising at least one frame which is able to be fastened on the surface of the piece of equipment, and at least one closure, held so as to be adjustably movable on the frame via a mounting, which is able to be brought into a closed position covering the image capture facility or into an open position exposing the image capture facility, wherein the closure has an adjustment part and at least one adjustment limiter arranged on the adjustment part, and wherein at least the adjustment part has an aperture for the image capture facility.

15. Closure device for an image capture facility, integrated in a piece of equipment, comprising at least one frame which is able to be fastened on the surface of the piece of equipment, and at least one closure, held so as to be adjustably movable on the frame via a mounting, which is able to be brought into a closed position covering the image capture facility or into an open position exposing the image capture facility, wherein the closure is held in a slidably movable manner on the frame, and wherein the surfaces of the frame and of the closure have in their end regions respectively an outwardly curved path.

* * * * *